US007398778B2

(12) United States Patent
Kaiser

(10) Patent No.: US 7,398,778 B2
(45) Date of Patent: Jul. 15, 2008

(54) SOLAR AND HEAT PUMP POWERED ELECTRIC FORCED HOT AIR HYDRONIC FURNACE

(75) Inventor: Stewart R. Kaiser, Boynton Beach, FL (US)

(73) Assignee: Air Hydronic Product Solutions, Inc., Ft. Lauderdale, FL (US)

( * ) Notice: Subject to any disclaimer, the term of this patent is extended or adjusted under 35 U.S.C. 154(b) by 247 days.

(21) Appl. No.: 11/175,836

(22) Filed: Jul. 5, 2005

(65) Prior Publication Data

US 2006/0162720 A1 Jul. 27, 2006

Related U.S. Application Data

(60) Provisional application No. 60/680,075, filed on May 11, 2005, provisional application No. 60/679,889, filed on May 10, 2005, provisional application No. 60/645,944, filed on Jan. 24, 2005.

(51) Int. Cl.
*F24D 9/00* (2006.01)
*F24D 3/09* (2006.01)

(52) U.S. Cl. .......................... 126/101; 237/19; 122/40; 392/471; 136/248

(58) Field of Classification Search ................. 126/101, 126/99 R, 110 E; 237/2 B, 19, 8 R; 122/20 R, 122/40, 1 A; 62/324.1; 136/244, 248; 165/58, 165/48.1; 392/399, 468, 471, 478
See application file for complete search history.

(56) References Cited

U.S. PATENT DOCUMENTS

| | | | | |
|---|---|---|---|---|
| 4,112,281 A * | 9/1978 | Epps | | 126/101 |
| 4,125,151 A | 11/1978 | Hays et al. | | |
| 4,147,157 A * | 4/1979 | Zakhariya | | 136/248 |
| 4,171,772 A | 10/1979 | Hays et al. | | |
| 4,274,581 A | 6/1981 | Hays et al. | | |
| 4,293,093 A | 10/1981 | Raymond et al. | | |
| 4,426,037 A * | 1/1984 | Bernstein | | 237/19 |
| 4,483,319 A * | 11/1984 | Dinh | | 126/646 |
| 4,640,458 A * | 2/1987 | Casier et al. | | 237/17 |
| 4,718,185 A * | 1/1988 | Conlin et al. | | 136/251 |
| 4,796,437 A | 1/1989 | James et al. | | |
| 4,798,240 A | 1/1989 | Gerstmann et al. | | |
| 5,074,464 A | 12/1991 | Moore, Jr. et al. | | |
| 5,129,034 A | 7/1992 | Sydenstricker | | |
| 5,239,838 A | 8/1993 | Tressler | | |
| 5,305,614 A | 4/1994 | Gilles | | |
| 5,351,502 A | 10/1994 | Gilles et al. | | |
| 5,361,751 A * | 11/1994 | Biggs | | 126/101 |
| 6,109,339 A * | 8/2000 | Talbert et al. | | 165/48.1 |
| 6,347,527 B1 | 2/2002 | Bailey et al. | | |
| 6,739,139 B1 | 5/2004 | Solomon | | |
| 2005/0056042 A1 | 3/2005 | Bourne et al. | | |

FOREIGN PATENT DOCUMENTS

| | | |
|---|---|---|
| CH | 636 689 A5 * | 6/1983 |

* cited by examiner

*Primary Examiner*—Josiah C. Cocks
(74) *Attorney, Agent, or Firm*—Abelman, Frayne & Schwab

(57) ABSTRACT

A furnace in combination with a heat pump and solar panels for providing domestic hot water and forced hot or cooled air utilizing heat pump achieved efficiency levels in an on-demand and unlimited domestic hot water, heating and air conditioning system. In heating mode, recycled air acquires heat from the heat pump's condenser coil and transfers this heat to the on-demand hot water.

17 Claims, 13 Drawing Sheets

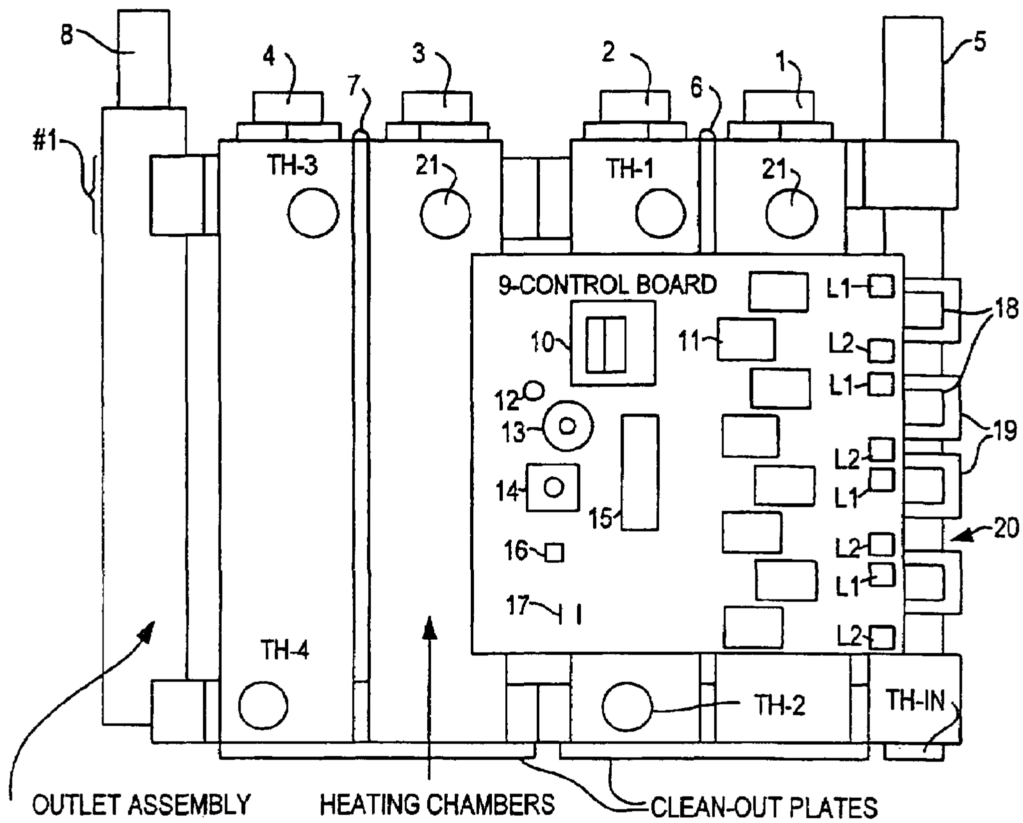

LEGEND

1 HEATING ELEMENT #1
2 HEATING ELEMENT #2
3 HEATING ELEMENT #3
4 HEATING ELEMENT #4
5 INLET WATER TUBE, 3/4"
6 WATER-LEVEL DETECT SCREW
7 WATER-LEVEL DETECT SCREW
8 OUTLET WATER TUBE, 3/4"
9 PRINTED CIRCUIT BOARD
10 TRANSFORMER
11 HEATING ELEMENT RELAYS (8)
12 LED LIGHT INDICATOR
13 AUDIBLE SPEAKER
14 OUTPUT TEMPERTURE CONTROL
15 MICROPROCESSOR CONTROL CHIP

LEGEND

16 BLUE BUTTON; ACTIVATES AUDIBLE
17 TERMINAL SPADES FOR LEAK DETECT WIRES
18 TRIACS (4)
19 TRIAC MOUNTING BLOCKS TO HEAT SINK (4)
20 COPPER HEAT SINK TUBE
21 HIGH TEMPERATURE LIMIT SWITCHES (2)
L1 POWER CONNECTION LUGS (208 240 VAC)
L2 POWER CONNECTION LUGS (208 240 VAC)
TH-IN : INLET TEMPERATURE SENSOR
TH-1 : CHAMBER TEMPERATURE SENSOR #1
TH-2 : CHAMBER TEMPERATURE SENSOR #2
TH-3 : CHAMBER TEMPERATURE SENSOR #3
TH-4 : CHAMBER TEMPERATURE SENSOR #4

FIG. 4

FIG. 6
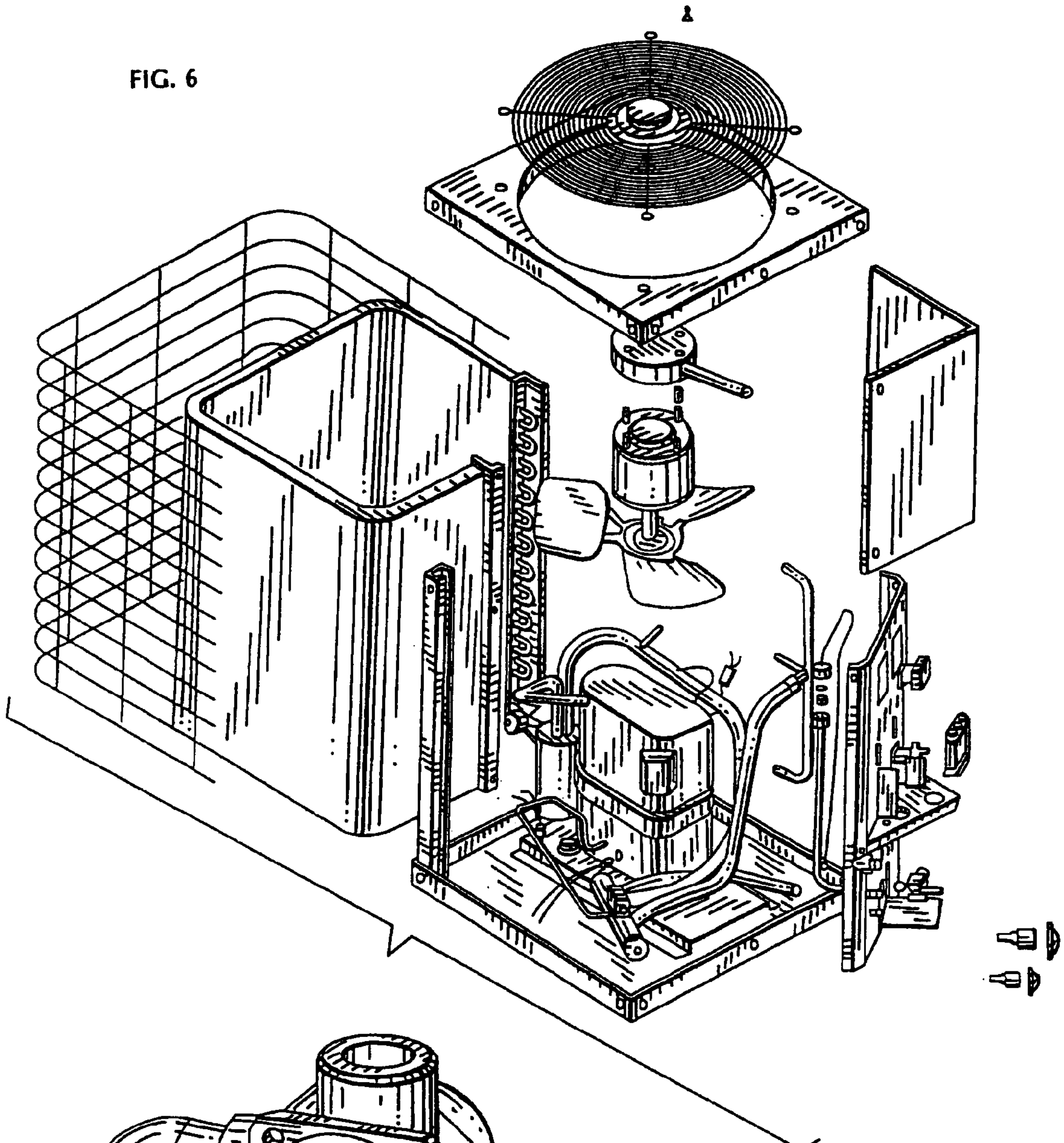
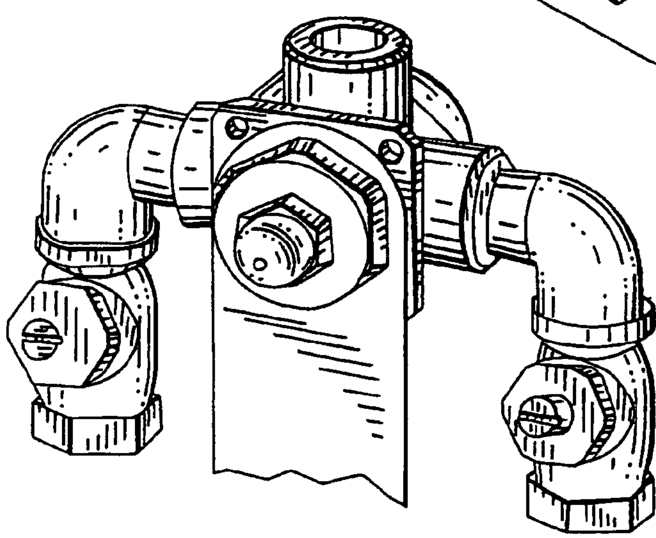
FIG. 10

HEAT PUMP REFRIGERANT CIRCUIT

FIG. 14
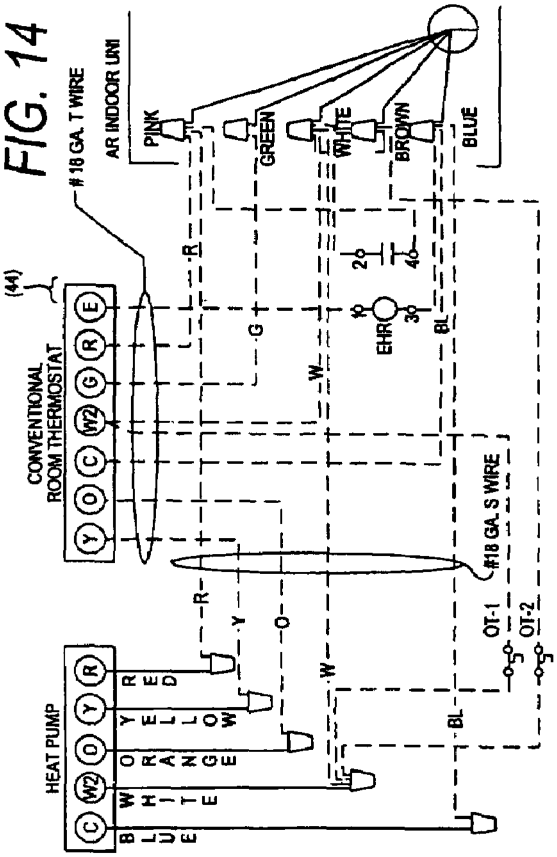
FIG. 13
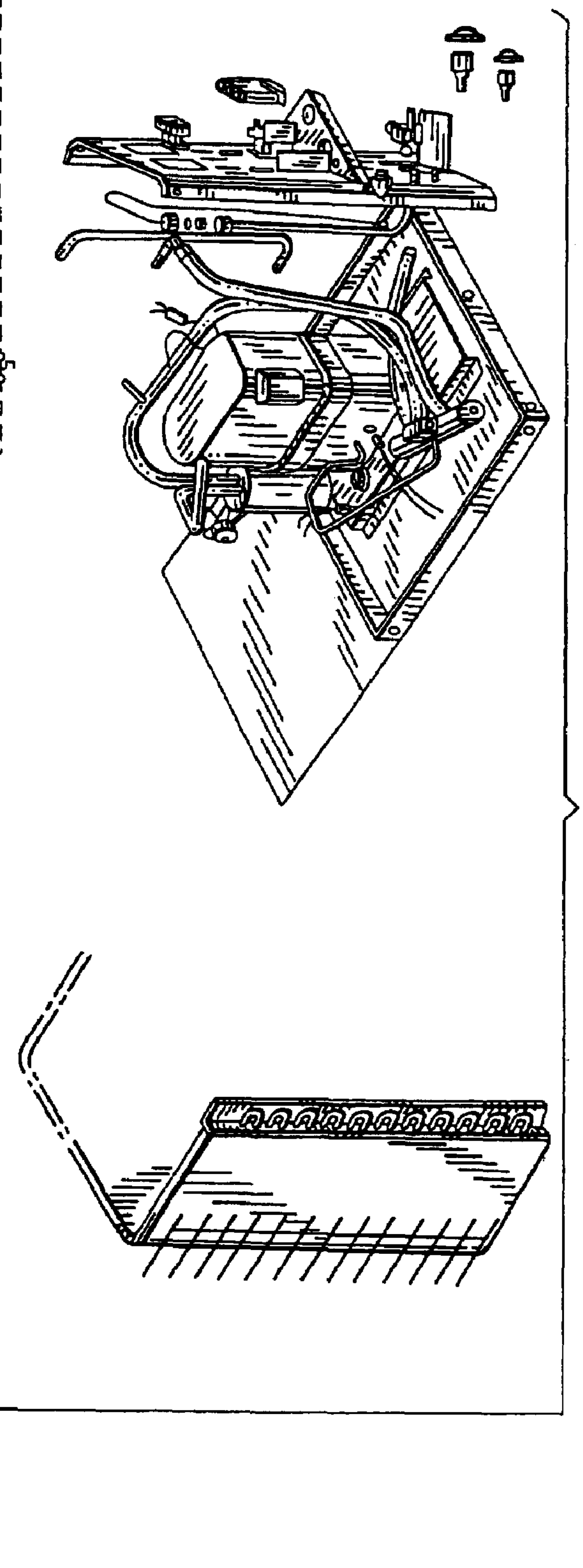
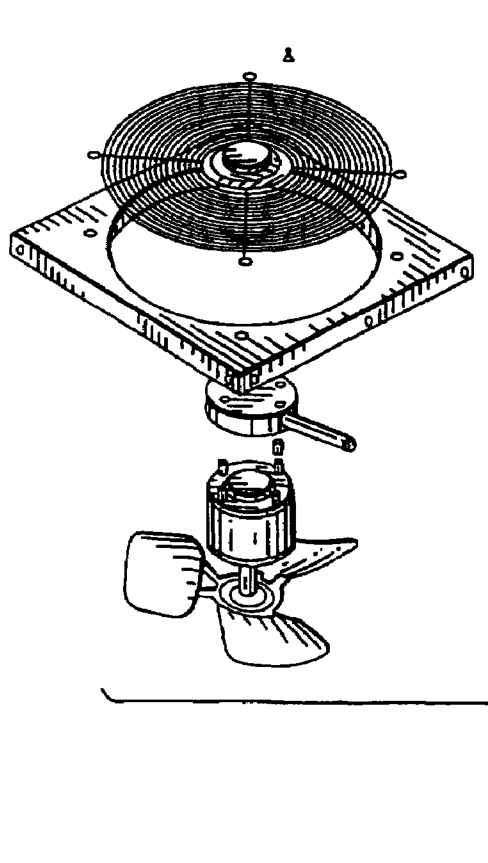

SOLAR AND HEAT PUMP POWERED ELECTRIC FORCED HOT AIR HYDRONIC FURNACE

This invention claims the benefit of:

a) U.S. Provisional Patent Application No. 60/645,944 filed Jan. 24, 2005, b) U.S. Provisional Patent Application No. 60/679,889 filed May 10, 2005 entitled Electric Forced Hot Air Hydronic Furnace, and c) U.S. Provisional Patent Application No. 60/680,075 filed May 11, 2005 entitled Solar Panel and Heat Pump Powered Electric Forced Hot Air Hydronic Furnace under 37 C.F.R.§§ 1.78 & 1.53 and other relevant sections.

I. BACKGROUND

A. Field of the Invention

This invention is in the field of solar panel energy systems and furnaces and furnace systems for providing forced air heating and cooling and providing hot water, and particularly for providing forced air heating and cooling and on-demand domestic hot water in conventional single family homes and in other buildings and environments.

B. Prior Art-Patent References

Prior art patents of interest include U.S. Patent Numbers listed below, these patents being incorporated herein by reference to disclose relevant prior art.

| | | |
|---|---|---|
| 4,125,151 | 11/1978 | Hays, et al. |
| 4,171,772 | 10/1979 | Hays, et al. |
| 4,274,581 | 6/1981 | Hays, et al. |
| 4,293,093 | 10/1981 | Raymond |
| 4,796,437 | 1/1989 | James |
| 4,798,240 | 1/1989 | Gerstmannetal |
| 5,074,464 | 12/1991 | Moore, Jr., et al. |
| 5,239,838 | 8/1993 | Tressler |
| 5,305,614 | 4/1994 | Gilles |
| 5,351,502 | 10/1994 | Gillesetal |
| 6,347,527 | 2/2002 | Bailey. et al. |
| 6,739,139 | 5/2004 | Solomon |

C. Prior Art-Heating, Cooling and Hot Water Systems

Conventional home heating ventilating, air conditioning (HVAC) and hot water systems use fossil fuel furnaces, electrical resistance heaters and combinations of same. For such conventional furnaces which use combustible fuels to produce hot water and heated air for a home fossil fuels, notably oil, have been experiencing dramatically increased costs. Furthermore, these furnaces operate in an energy wasteful manner. One aspect of this wasted energy occurs because a typical gas or oil-fired water heater stores between 40-100 gallons of hot water at 140° F. for 24 hours a day for an average home, while the home uses the hot water for less then one hour per day. Further undesirable aspects are: (a) that firing oil, propane or natural gas to heat homes releases harmful carbon monoxide and other pollutants into the environment, (b) much of the heat generated by the fuel rises up the chimney or flue and is wasted into outdoor air, and (c) the wasted heat adds to global warming.

Due to this increase in fossil fuel prices, in addition to an increase in overall electric consumption placing a toll on the power grids, and the general inefficiencies of these systems, there has been a major interest in alternative methods and more efficient techniques of heating and cooling a house.

One of the best known approaches seeking to conserve energy and cost is to use an on-demand tankless or flash hot water heater, which heats only the water being used at the time of the demand and thus has no water storage tank and no cost to heat or maintain heated a large quantity of stored water. However, such tankless hot water heaters still require heat from fossil fuel or from electricity, with the usual waste and efficiencies. Another prior art system uses an air handler with a hot water coil; however, this technique uses hot water produced by an oil or gas fired boiler to be fed through a coil to produce hot air, with the previously described waste in energy during the heating cycle.

Also known in the prior art are combined heating and cooling systems in which a warm air furnace has associated with it an air conditioning system having a cooling coil placed in the air duct. However, such systems are essentially two complete systems, a hot air heater which is relatively large and bulky and a cooling coil from an independent cooling system.

It is also known to combine a refrigeration system and hot water heating system to affect a transference of heat energy therebetween. For example, U.S. Pat. No. 4,293,093 ("the '093 patent"), discloses a refrigerant system and hot water heating arrangement, wherein the superheat of the refrigerant is rejected to water to be heated, such that this heat energy may be utilized to provide hot water. In effect, the '093 patent teaches the capturing of waste heat from a refrigerant and the subsequent use of the heat for a useful intended purpose. However these techniques, as well as heat pumps employed to heat water, use liquid-to-liquid heat exchangers, as described in FIG. 8 and FIG. 11 of U.S. Pat. No. 4,796,437 ("the '437 patent"). These methods also involve storing the water with the inherent loss of energy in such storage systems.

Tankless or on-demand unlimited domestic hot water systems have been limited to utilizing resistance electric or fossil fuels for the primary source of energy. While this technique saves considerable cost associated with producing domestic hot water by not having to store the heated water and absorbing the energy loss related to that method, it still requires traditional heat input with traditional inefficiencies.

II. SUMMARY OF THE INVENTION

The present invention is a high efficiency electric forced hot air hydronic furnace capable of producing within a system: (a) forced hot air heat more efficiently then conventional oil, gas or electric furnaces, (b) unlimited domestic hot water without a storage tank, and (c) cooled air. This invention comprises numerous combinations and subcombinations of system components, with the first object of this invention being to provide for typical domestic homes a new highly efficient and pollution free furnace for producing on-demand hot water.

It is a further object for such a new furnace to also provide heating and cooling for the forced air ventilation system.

It is a still further object for such a furnace to produce hot water with the extremely high energy and cost efficiency resulting from the incorporation of a heat pump into the hot water heating function.

In a preferred embodiment of this invention the on-demand hot water is heated in a hydronic coil heat exchanger that received heat from an airflow that is heated by a condenser coil of the heat pump.

It is another object to combine this new furnace with an electric resistance flash heater, such that water will be heated by the flash heater only when there is insufficient heat from the heat pump and hydronic coil subcombination to satisfy the on-demand hot water requirements.

This new furnace is smaller in size then a standard furnace and is still capable of producing all the heat, hot water and air conditioning utilities required for an average home, without using combustible fuels, flues or chimneys, and without producing emissions and carbon monoxide, this being achieved with extremely high efficiency and essentially no wasted heat.

The new furnace employs a technique of using heat pump efficiency transferred to an on-demand unlimited domestic hot water system. More specifically, this new technique combines the energy savings of an on-demand unlimited domestic hot water system with the energy efficiencies of a heat pump, the latter commonly exceeding fossil fuel efficiencies by a three-to-one ratio, while using excess heat for heating air flow for the forced air system. The new technique, furthermore, has a cooling capability without utilizing a common heat exchanger.

The preferred embodiment of this invention comprises a compact combination hydronic forced hot air heating system, air-cooling system and an unlimited domestic hot water system. This invention will operate in several different and separate modes depending on the demand in the home for domestic hot water, heated and/or cooled air.

In the heating mode the system cycles in two separate and independent stages. Stage One heating (which does not use the heat pump) activates the water pump, and then the circulating water activates the hydronic flash heater via a flow activation sequence. The flash heater is connected to a main water supply for producing on-demand hot water, but also has a closed loop flow path through the hydronic heating coil located on the top of the furnace. Approximately a half a gallon of water is flash heated to about 160° F.-180° F. using electric elements within the core of the flash heater exchanger tubes. This hot water circulates through the hydronic coil and back to the heater to be re-flashed and so on. This method maintains a temperature between 160° F.-180° F. at the hydronic coil. The blower moves air across the coil, where the air absorbs this heat and is then delivered into and through the home duct system.

Stage Two heating activates the heat pump, which provides heat to the domestic hot water via the airflow, which picked up heat from the heat pump's condenser coil. This method allows for an extremely efficient transfer of heat to a hydronic coil and thence to the water. Upon the flow of the domestic water supply created by opening any hot water faucet valve, the cold water from the main supply flows across the hydronic coil in which the heat originating from the heat pump is absorbed by the cold water. This is part of the on-demand technique in which the water then flows directly to the opened faucet.

Additional heating, if necessary to achieve desired domestic hot water temperature, is achieved by the flash heater; however, usually this requires only a small amount of energy. A thermostatic mixing valve assures a desired water temperature of about 105° F., thus reducing the risk of scalding or changing water temperatures caused by irregular water pressures.

This method of transferring heat pump created heat to an on-demand domestic hot water system will enable a home owner to heat water at a fraction of the cost of any other domestic water heating technique and to do so without waste or emissions.

Upon a request for air conditioning, the heat pump operates as a normal air conditioning unit, where the evaporation coil becomes cold, thus enabling the system to cool and dehumidify the air. In this air conditioning mode, when there is a call for domestic hot water, the flash heater will heat the water to the desired temperature and flow the water through the mixing valve without effecting the air conditioning cycle or radiating any of the heat created by the flash heater into the air stream. This is accomplished by water pressure against a closed loop and a series of appropriate check valves.

In summary, this new method of super efficient heating, cooling and domestic water heating from a single compact unit achieves the following objectives. This method requires only one free standing system as opposed to three separate conventional systems, namely (a) a furnace for forced hot air heating, (b) an air handler or coil for air conditioning, and (c) a hot water heater tank for domestic hot water. This new system thus significantly reduces space required for a mechanical room. Unlike a hot water tank, this new system allows for unlimited hot water without limitation or restriction by the amount of gallons stored or recovery capability. This new method saves a great deal of energy as compared to conventional systems, and there are no emissions and essentially no heat losses involved with this system. In addition to affording heat pump efficiency in an on-demand energy saving domestic hot water system, the new system provides adjusted and pre-regulated domestic hot water, regardless of the season or demands on the heating or air conditioning system.

The preferred embodiment of this new system the flash heater uses a small amount of water (usually less then one gallon) to be super heated to about 160° F. within seconds, with very little power (usually less then 30 amps, 220V). This super heated hot water is then circulated through a hot water coil within the furnace. At this time the blower motor is re-circulating the air through the duct system, across the coil and into a tube restrictor, that compresses the air back through the coils, while heating the air within just a few degrees of the water, and creating a super efficient heat exchange. The air leaving the air chamber is between 120° F.-158° F. The water is then circulated back to the tankless heater strip approximately 30° F. cooler then the temperature it had on entering the air chamber. The flash heater uses only a small amount of energy to reheat the water to 160° F. With the system as thus described, essentially 100% of all the electrical energy entering the system, there is essentially no wasted energy, and a cost saving of up to 60%.

III. BACKGROUND OF SECOND EMBODIMENT

The known art concerning conventional heat pumps and air conditioners is well documented and understood. These systems compress refrigerant and remove or transfer heat from one location to another. They are usually located on the ground outside of a building or structure or located on the roof. These units usually function on standard line voltage from a fused disconnect box attached to the unit.

Solar photocells and panel structures are well known and are usually installed on roofs or on ground level facing the sun. These systems usually store energy in batteries or convert the current from A/C to D/C using inverters. However, this method is proving to be less practical due to the cost and space involved with capturing and storing the amount of energy required to supply enough electricity to sufficiently operate a standard house. Large panels take up a significant amount of space or real estate, making this method not very practical in city application; in addition most homeowners do not desire massive panels located on their roofs just for cosmetic reasons.

Also, the cost of installing an adequate solar system cannot be justified using the cost of kilowatts in today's market: for example, a standard solar system will cost about $30,000.00 and will produce approximately 10 kilowatts per day or about $0.50 worth of electricity.

IV. SUMMARY OF THE SECOND EMBODIMENT

Combining (a) solar technology based on net metering with (b) the efficiency achieved by heat pump methodology, can create a tremendous amount of energy savings for a building or residence. The installation cost factor in most cases is $zero due to extensive incentives and rebates offered by local, state and federal agencies.

Building the skin or body of a heat pump or air conditioning condensing unit out of efficient photocells or cladding the outside surface of the unit with photocells, allows the unit to absorb energy from the sun and produce an electric current that is passed into a low voltage, low amperage inverter and back through the existing fused disconnect box already attached to the unit. This technique requires no more wiring or piping then a normal heat pump or A/C installation. By utilizing the line voltage lines normally installed on a heat pump or A/C system, the energy can be transferred back through the line through the fuse box and to the electric meter for instant use by the homeowner or for net metering, which virtually spins the electric meter backwards to store credits for the homeowner when he may need them. In addition, this technique of using the body of the heat pump or A/C to hold the solar panels eliminates the need to place solar panels on a roof or over large areas. It is unlikely that anyone would object to a heat pump or A/C which looks like a conventional system, outside his/her home. Also, placing the unit on the south side of a building in the northern hemisphere, will allow for optimum efficiency of the photocells.

Storing credits with net metering allows the homeowner to have free electricity when he needs it during the most in the summer or winter months; also, utilizing the efficiency created by a heat pump or A/C allows these kilowatts that would usually be too little to make much difference in an electric bill to become a great asset when 1 KWH=10,000 BTUH of heat.

Utilizing the side of the heat pump or A/C that faces the building as the condensing coil side, achieves the purpose allowing the other three sides facing the sun full uninterrupted exposure. Using the side facing away from the south or sunny side to discharge the air achieves the same practical efficiency.

These and other objectives and advantages of the present invention will become apparent from the following description of the preferred embodiment and method and the accompanying drawings.

IV. BRIEF DESCRIPTION OF THE DRAWINGS

FIG. 4 is a schematic diagram of the flash heater component.

FIG. 6 is a schematic diagram of the heat pump.

FIG. 10 shows a thermostatically controlled water mixing valve.

DRAWINGS OF THE SECOND EMBODIMENT

Figure 11:
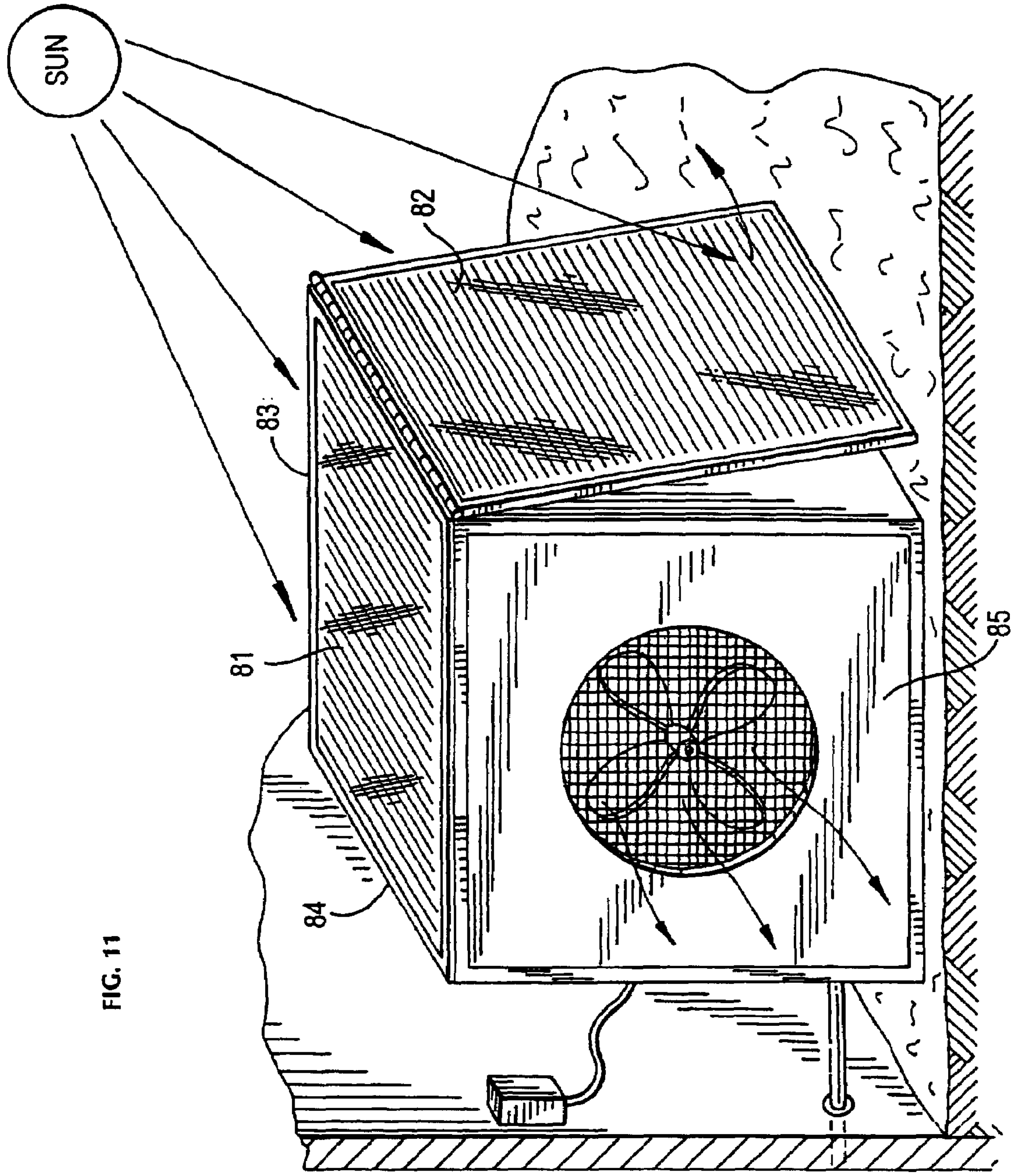

FIG. 11 is a top, front perspective view of a second embodiment of my invention, which utilizes solar panels in combination with the heat pump.

Figure 12:
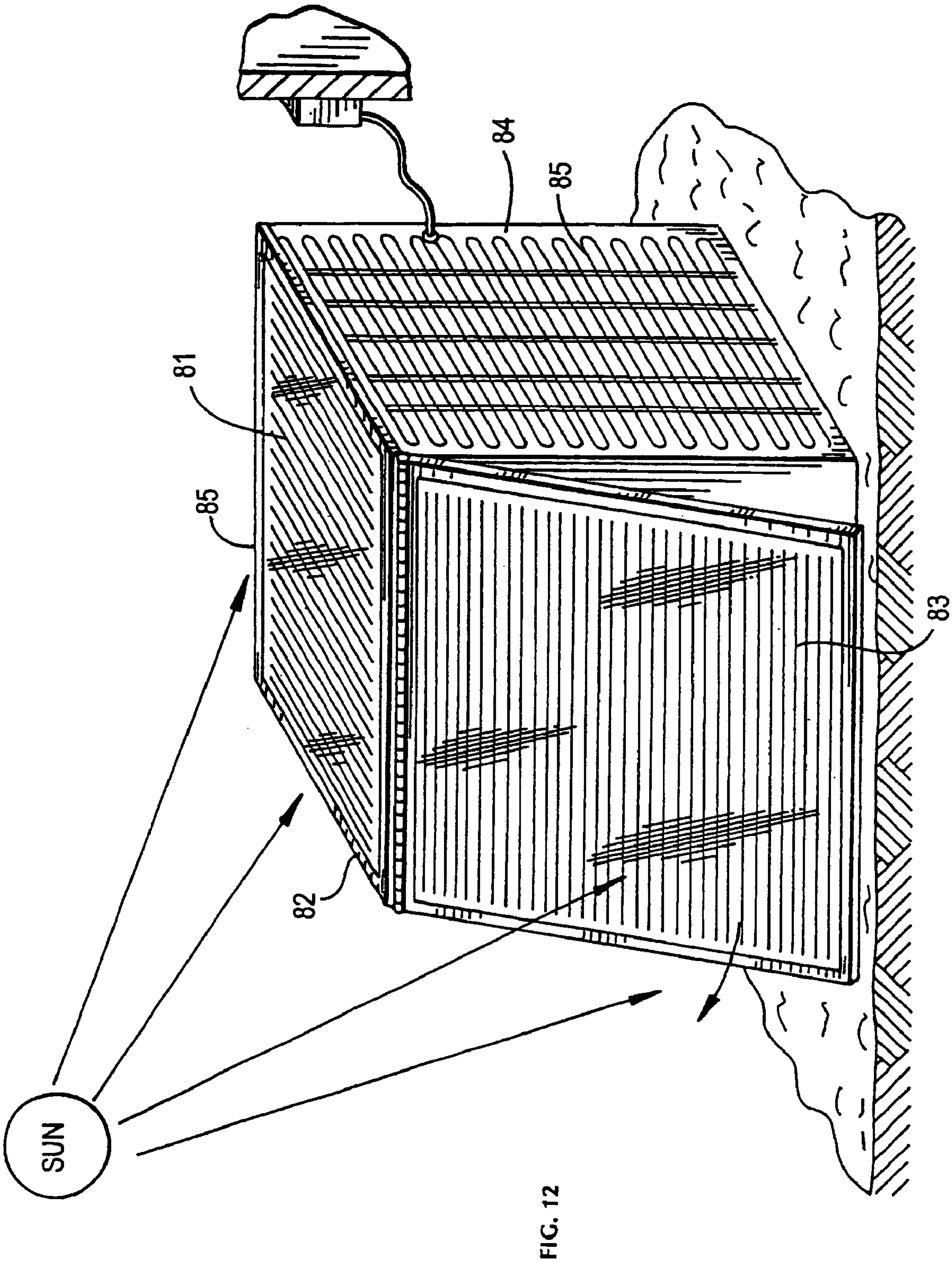

FIG. 12 is top, rear perspective view of the unit of FIG. 11.

FIG. 13 is a fragmentary exploded perspective view of the heat pump-solar panel unit.

FIG. 14 is a schematic wiring diagram for this system.

Figure 15:
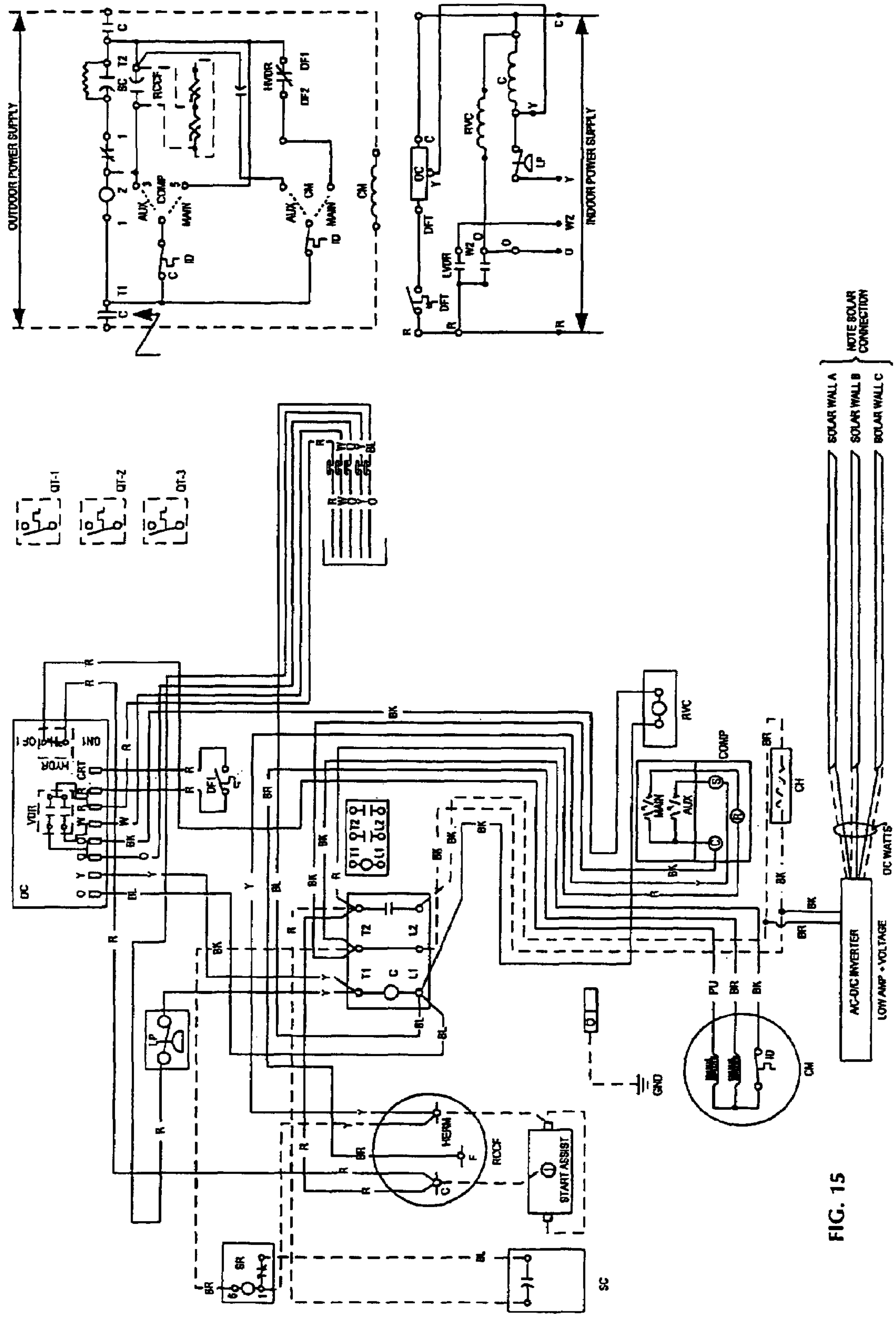

FIG. 15 is a schematic wiring diagram for this system.

Figure 16:
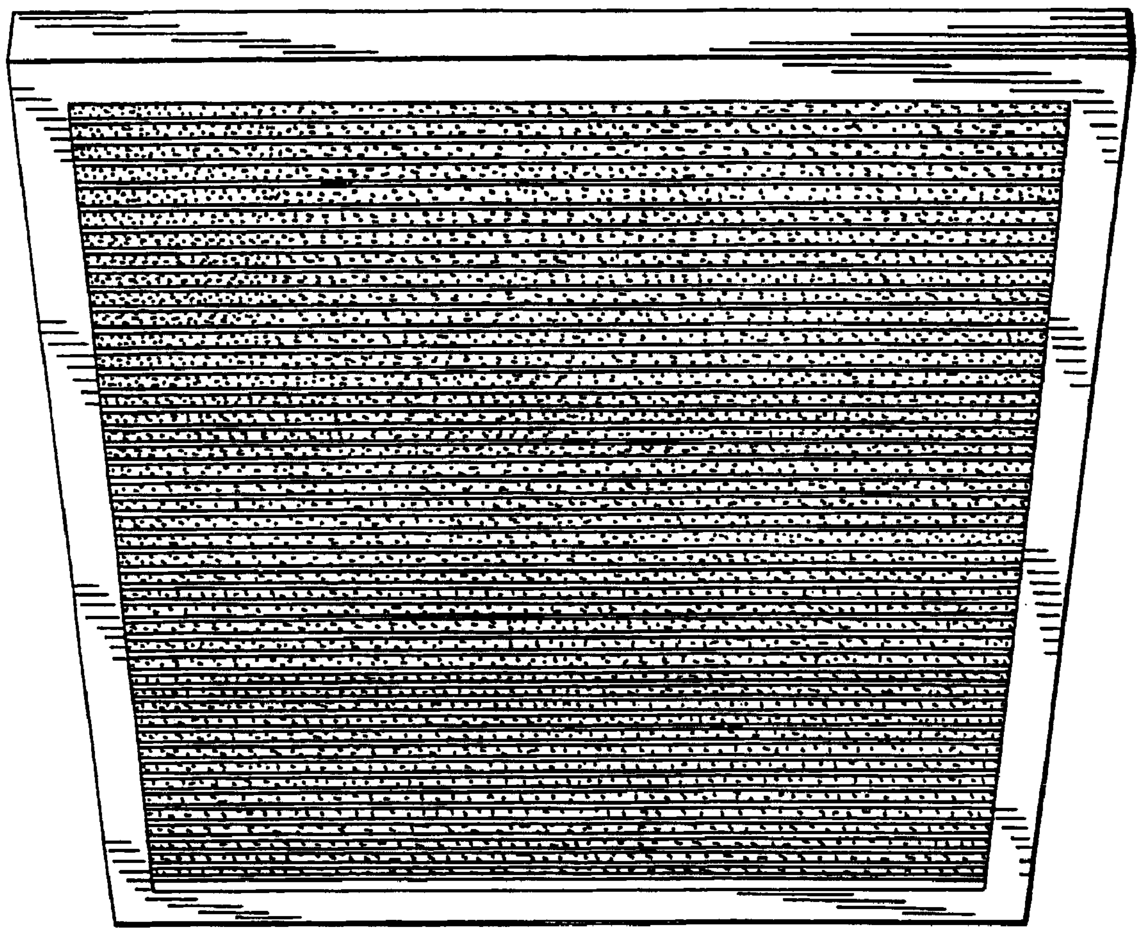

FIG. 16 is a fragmentary front perspective view of a solar panel.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations, which fall within the spirit and scope of the appended claims.

V. DETAILED DESCRIPTION OF THE PREFERRED EMBODIMENTS

First Embodiment

For convenience and clarity in describing these embodiments, similar elements or components appearing in different figures will have the same reference numbers.

Figure 1:
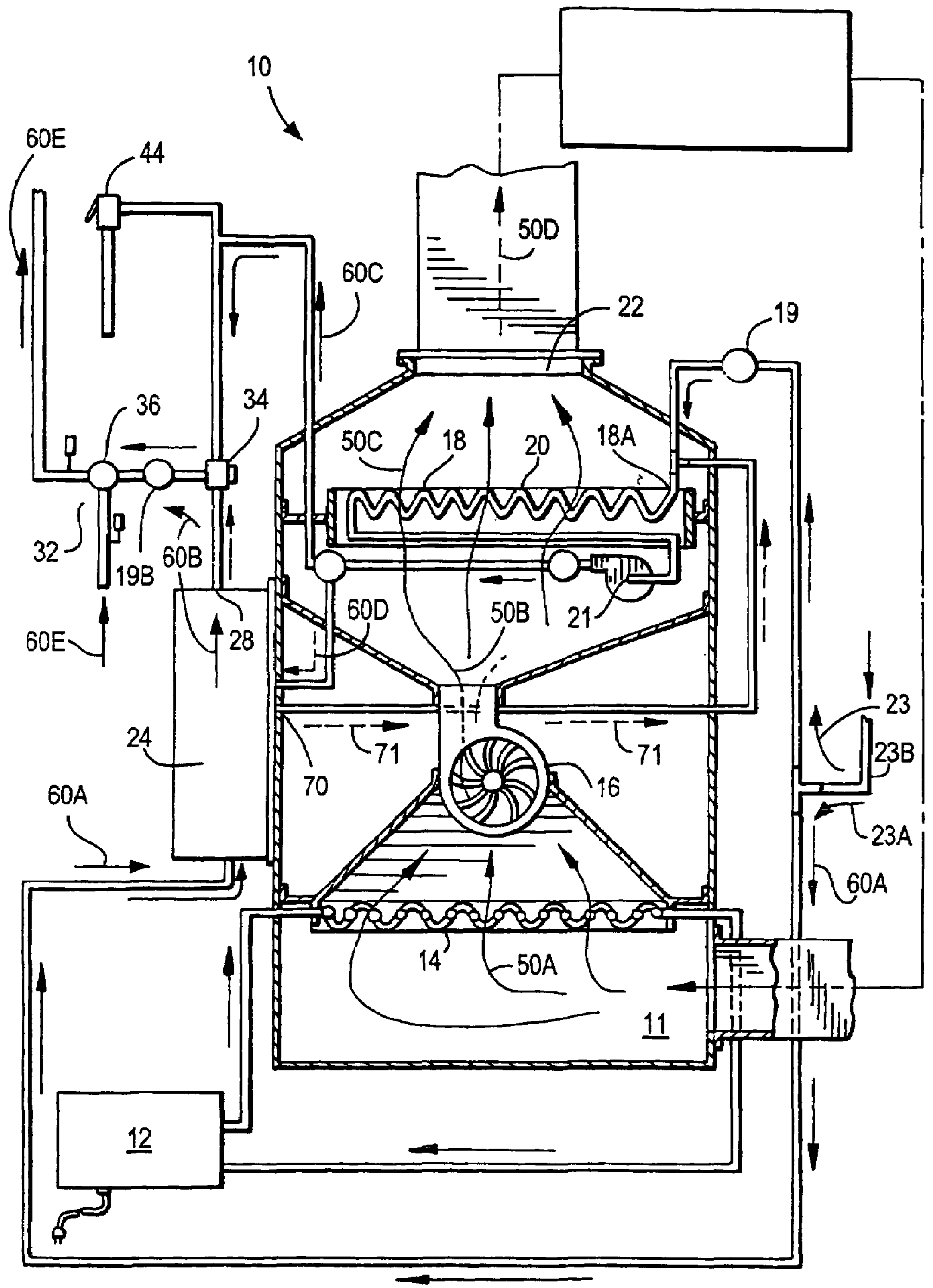
FIG. 1 is a schematic diagram of the invention illustrating all the operating components as well as the water and air directional flows.

FIGS. 1-10 illustrate a preferred embodiment of the new electric forced hot air hydronic furnace. FIG. 1 provides an overall schematic view of the new furnace. For clarity and convenience reference numbers utilized in FIG. 1 are listed below along with the component or function that relates to each reference number:

Furnace 10
Return air inlet 11
Heat pump 12
Condenser coil 14
Blower 16
Hydronic coil heat exchanger 18
Hydronic coil heat exchanger 18A
Check valve 19A in cold water pipe to hydronic coil
Check valve 19B in hot water flow to mixing valve 36
Hydronic coil 20
Water pump 21
Forced air duct inlet 22
Main cold water supply 23
Cold water supply to flash heater 23A
Cold water supply to hydronic coil 23B
Flash heater 24
Cold water inlet to flash heater 26
Hot water outlet from flash heater 28
Check valve 34 (for hot water from flash heater and hot water from hydronic coil)
Mixing valve 36 (for hot and cold water)
Further check valves
Thermometers
Pressure relief valve 44
Return air flow path through condenser coil, 50A
Air flow path through blower, 50B
Air flow path through hydronic coil heat exchanger, 50C
Air flow path into forced air duct system, 50D
Inlet cold water flow into flash heater, 60A (in pipe 23B from cold water source 23)
Water flow path from flash heater to domestic pipes, 60B
Water flow path from hydronic coil to domestic hot water supply, 60C Water flow from hydronic coil back to flash heater to be reheated, 60D Inlet cold water to domestic cold water supply, 60E Hot water flow for domestic needs, 60F FIG. 1 illustrates the overall system of the new furnace 10, except that the electrical and mechanical controls are omitted and shown in subsequent drawings. The heat pump is represented schematically by the box marked 12, with its condensation coil heat exchanger 14 situated in the return airflow path indicated by arrows 50A. The airflow path is further shown by arrow 50B through blower 16, arrows 50C through hydronic coil heat exchanger 18 and arrow 50D into house duct system.

The water flow paths are indicated by cold water supply 23 which divides into pipe 23A feeding the flash heater 24 and pipe 23B feeding the hydronic coil 20. Water pump 21 directs the heated water through valve 21A either up via path 60C to the domestic hot water system or via path 60D back to flash heater 24 to be reheated and returned again to the hydronic coil.

Hot water flow 60B from the flash heater 24 or hot water flow 60C from the hydronic coil passes through check valve 34 and thence to mixing valve 35 where cold water 60E is added as required to result in hot water that is not excessively or dangerously hot.

Figure 2:
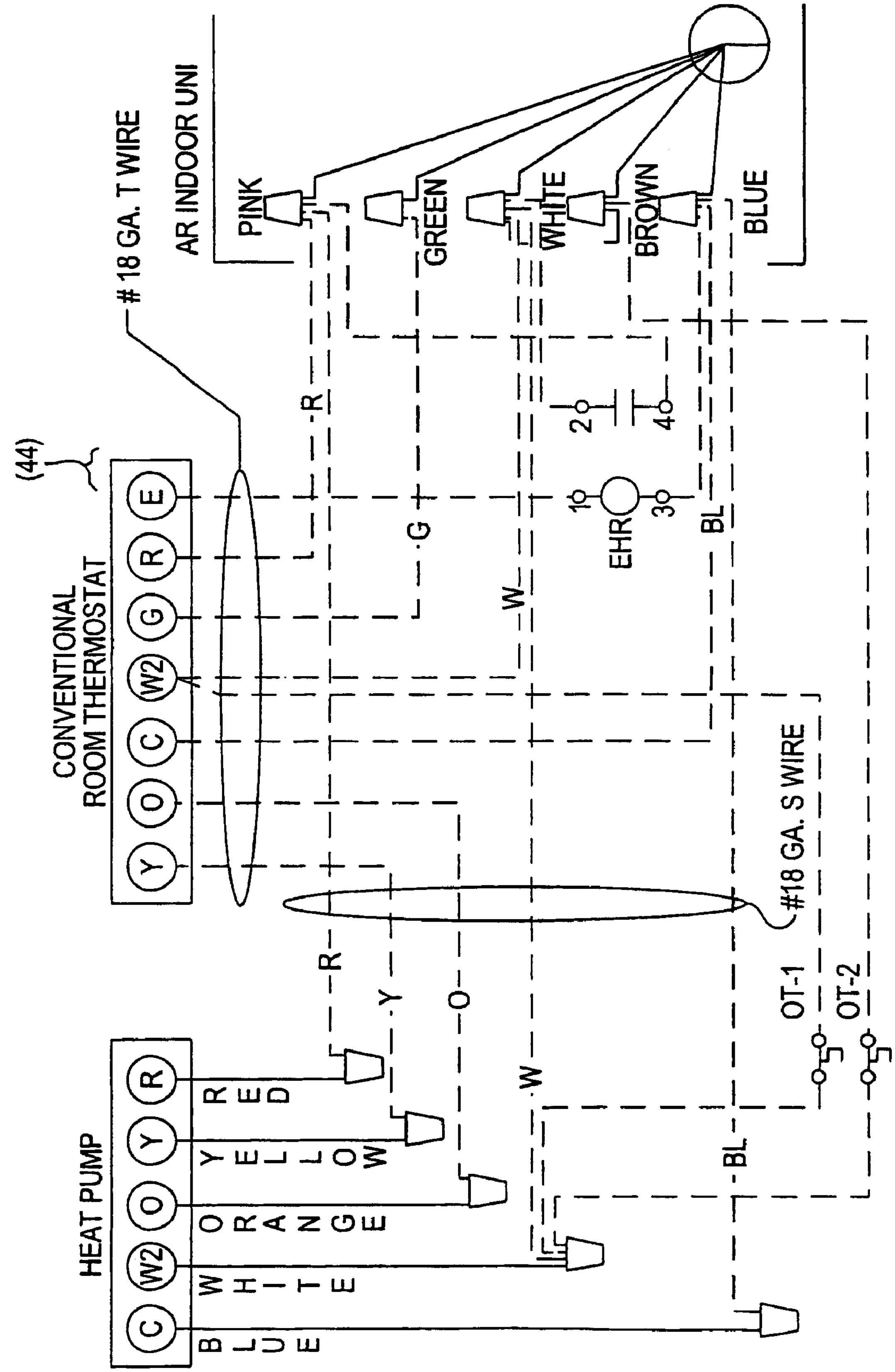
FIG. 2 is a low voltage wiring diagram for integrating the system into a typical multistage heat pump thermostat.
Figure 3:
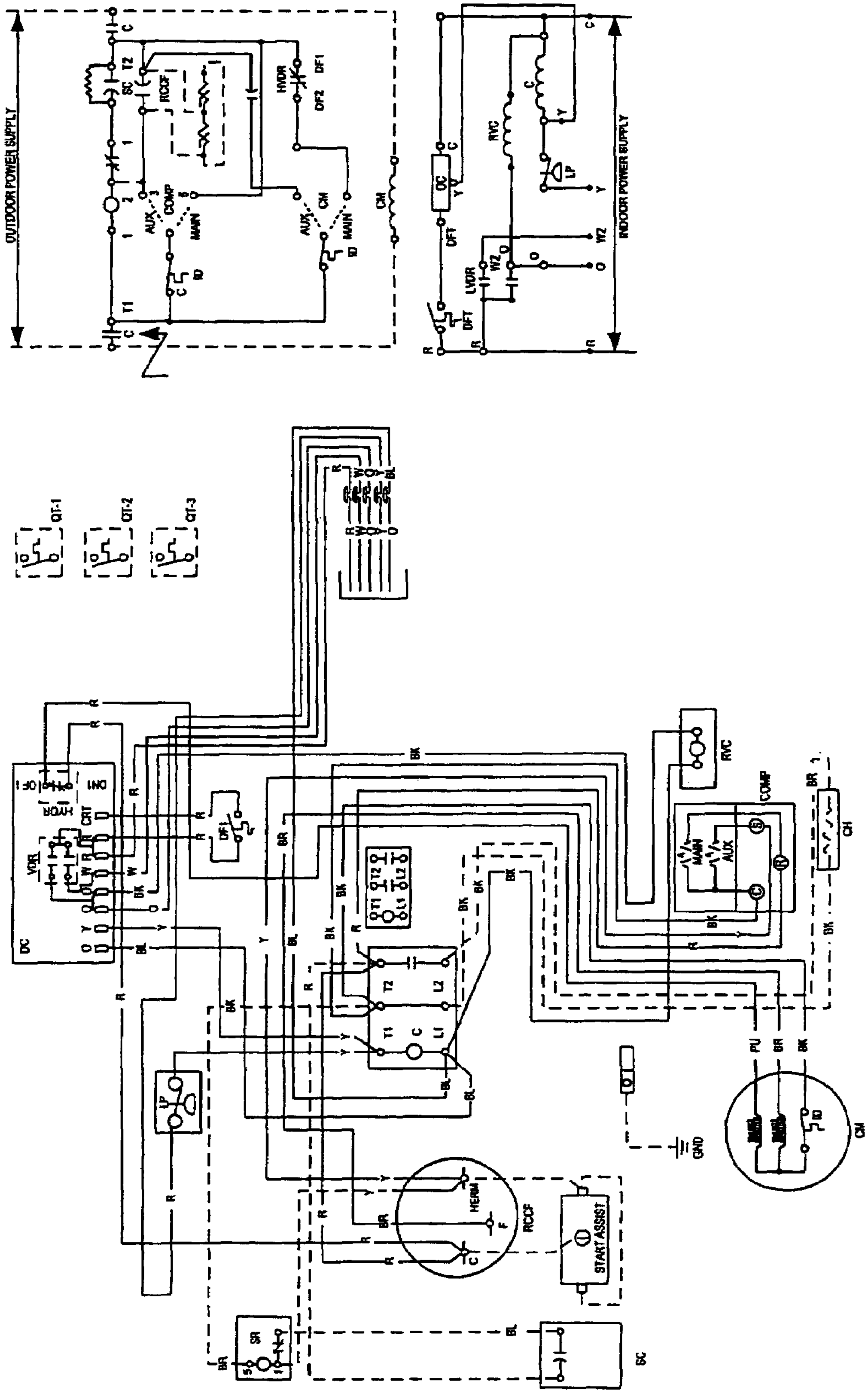
FIG. 3 is a wiring diagram for the heat pump.
Figure 5:
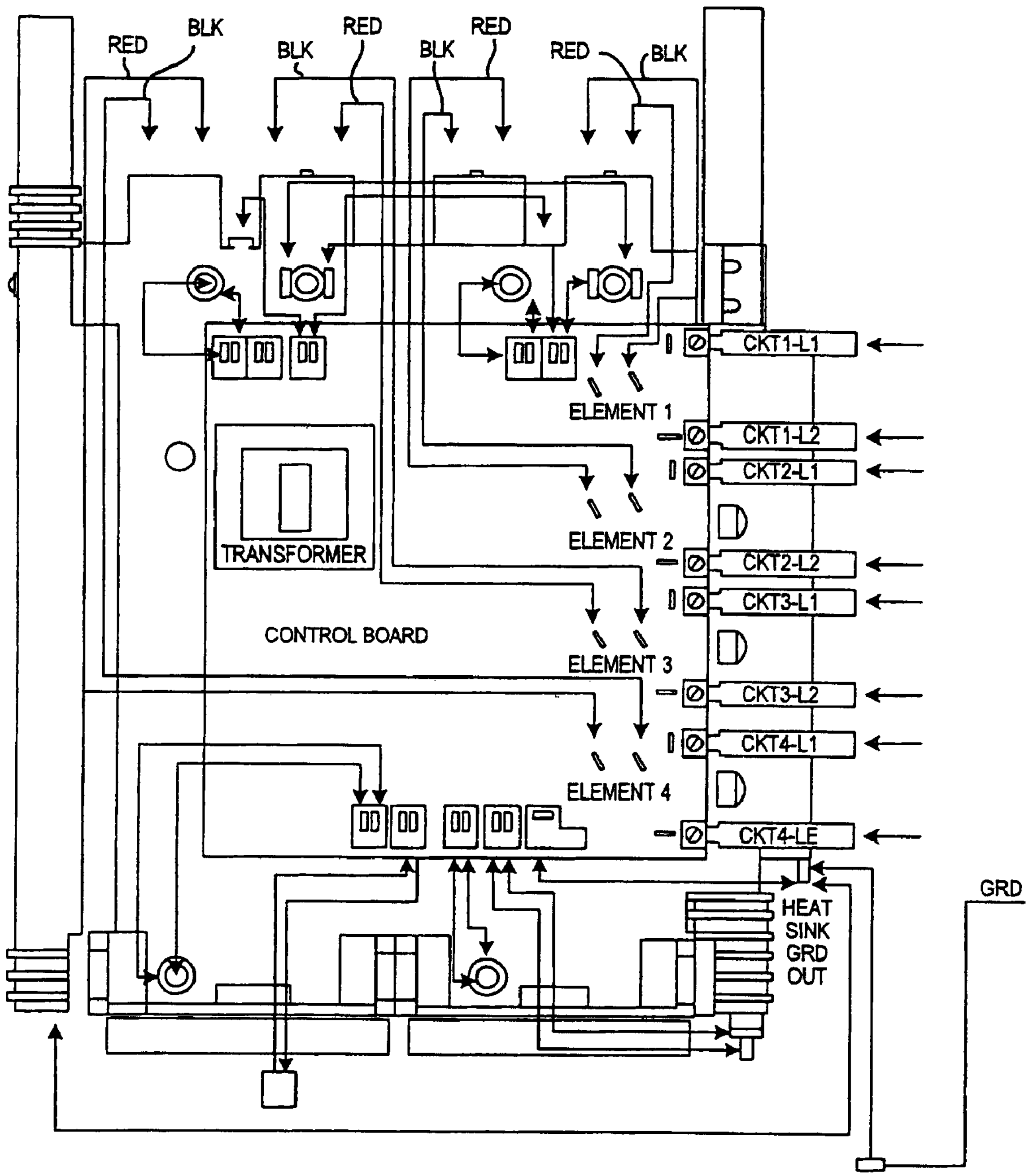
FIG. 5 is a wiring diagram for the flash heater component.
Figure 7:
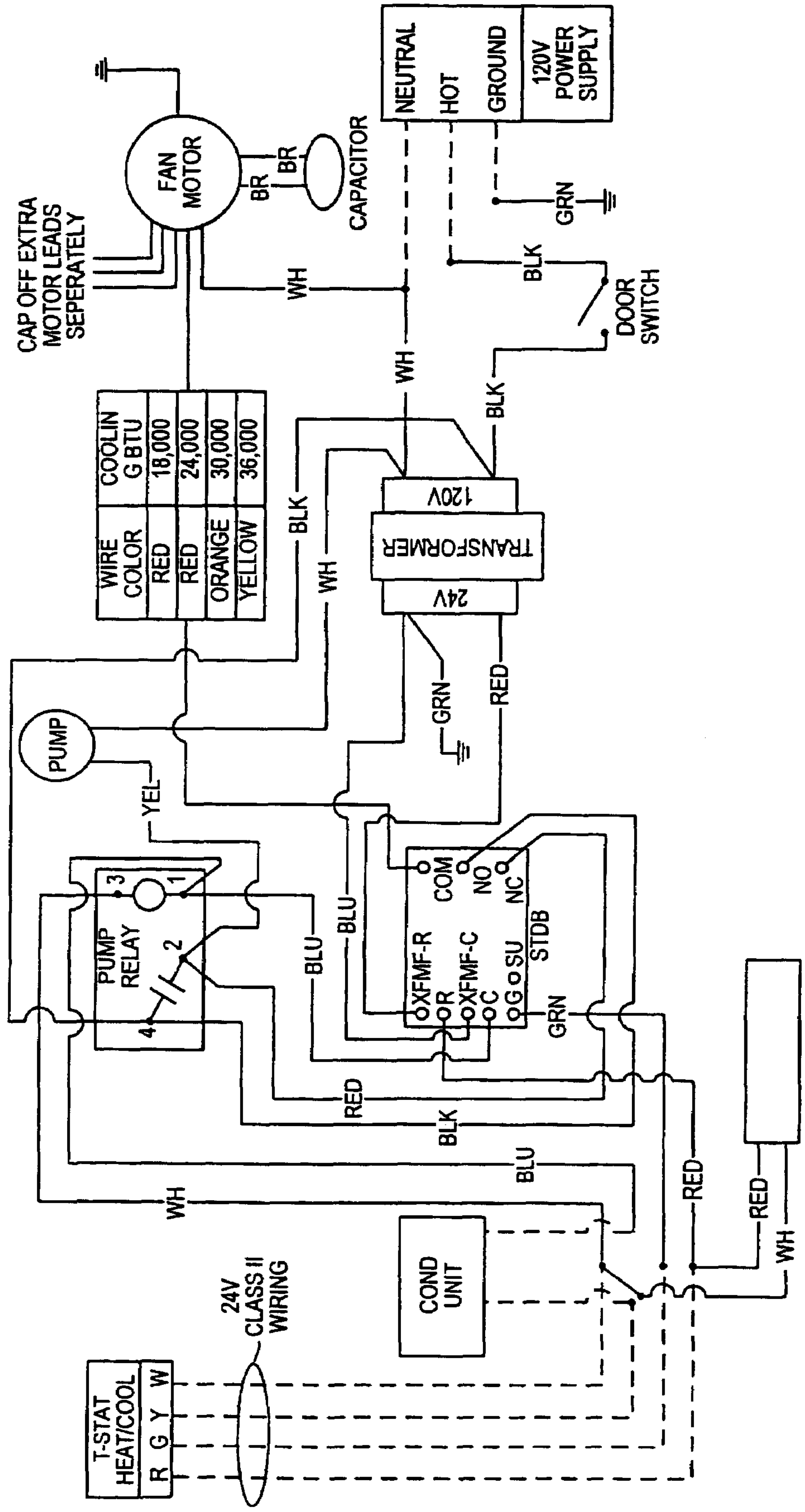
FIG. 7 is the wiring diagram for the present Electric Forced Hot Air Hydronic Furnace.

Referring to FIG. 2, conventional room thermostat 44 calls for heat using low voltage wiring in a closed circuit. In Stage Two heating, terminal Y activates the heat pump 12 (in FIG. 1) while terminal W2 activates water pump 21 (in FIG. 1). The flowing water in turn activates flash heater 24. The water circulates through check valve 19A and through check valve 19B. This method assures there will not be feedback to the main water supply.

The water is heated as follows: the heat pump 12 transfers heat to condensation coil 14. Air heated by coil 14 is driven by blower motor 16 across the hydronic coil 20. The residual air is then forced into the duct supply 22 for forced air heating. Additional heat produced by flash heater 24 is transferred into the hydronic coil heat exchanger via pipe 70 and flow path 71. Heat is further absorbed by the air passing through the hydronic coils indicated by arrow 50C.

Upon a call for domestic hot water by way of a faucet handle being activated, the hot water will flow through mixing valve 36, which is also illustrated in FIG. 10. This valve assures a constant temperature and flow rate. By this arrangement heat from heat pump 12 is transferred via condenser coil 14 to the on-demand hot water supply via flow path 60C. Cold water flowing into the furnace via flow path 60A is continually being heated using this same method.

Upon a call for air conditioning from conventional room thermostat 44 (see FIG. 2), condenser coil 14 becomes cold due to the heat pump operation. Air driven across condenser coil 14 (arrows 50A) caused by fan blower 16, is cooled and dehumidified and forced into duct supply 22.

Upon a call for domestic hot water, flash heater 24 will flash heat the domestic hot water to a desirable temperature, at which time the water will flow through mixing valve 36 assuring proper temperature and flow rate. The water cannot enter hydronic coil 20 due to the water locked loop and check valve sequence.

Upon a call for only domestic hot water without the heating or air conditioning activated, flash heater 24 will flash heat the water to a desirable temperature, at which time the water will flow to the mixing valve 36 to assure proper temperature and pressure.

Figure 8:
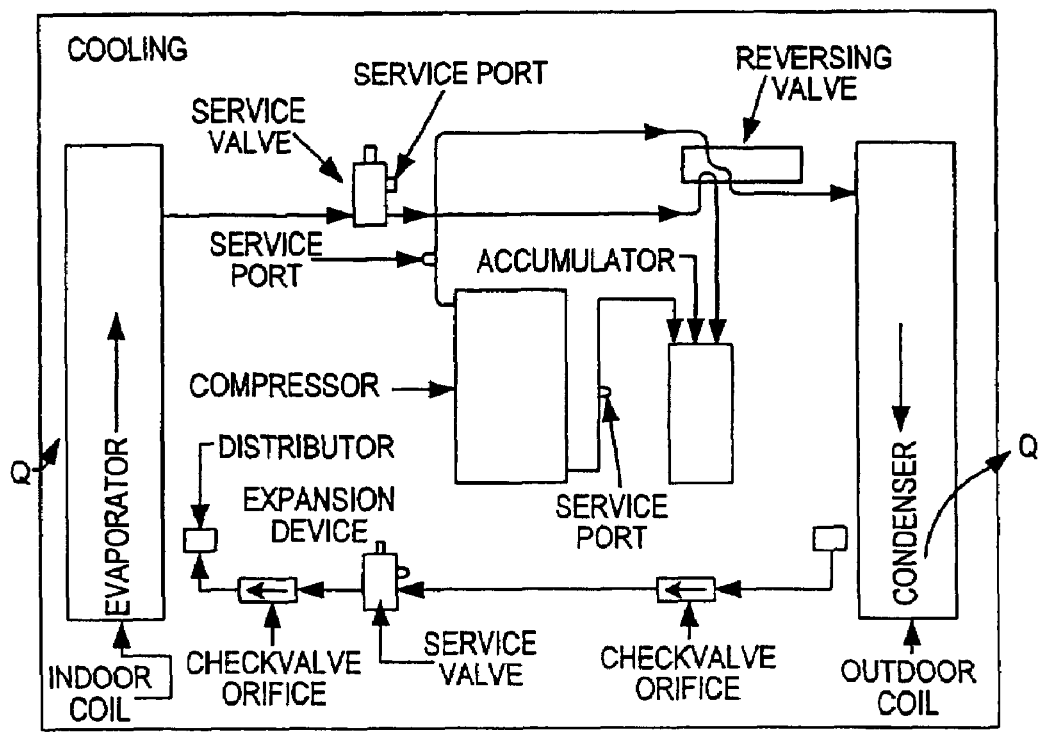
FIG. 8 is a schematic diagram showing refrigerant flow and process of the heat pump in cooling mode.
Figure 9:
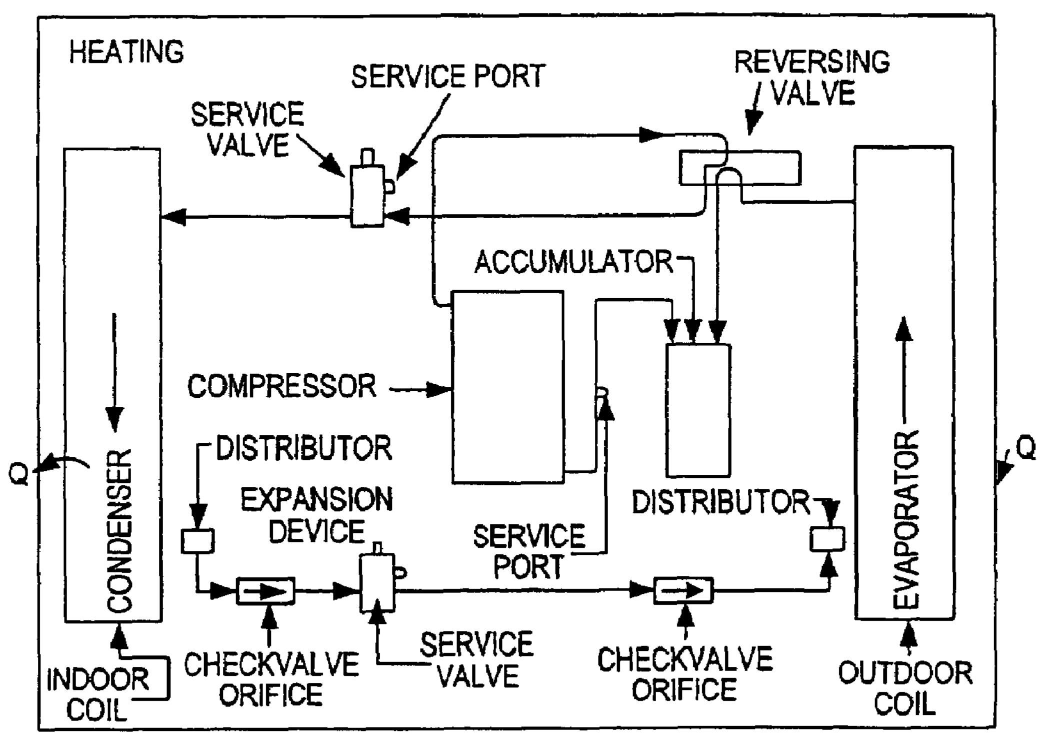
FIG. 9 is a schematic diagram showing refrigerant flow and process of the heat pump in heating mode.

FIG. 8 and FIG. 9 depict the flow of refrigerant and heat transfer to the condenser coil 14 within the Electric Forced Hot Air Hydronic Furnace 10 in a cooling and heating mode respectively.

FIG. 4 illustrates schematically a multi-stage heating element of a flash heater, which efficiently uses only the electrical energy required to subsidize the amount of heat necessary to achieve desired water temperature, when the heat pump 12 is unable to achieve absolute desired temperature. The difference between the heat absorbed by the water from condenser coil 14 and the desired water temperature is usually very small during the heating cycles.

TH-1 chamber temperature sensors along with pressure relief valve 44 (see FIG. 1) protect against a danger of excessive temperature or pressure. In addition, the flash heater 24 can only be activated by flowing water, therefore eliminating the chance of excessively heated water or pressure.

The operation of the new furnace has been described earlier in terms of Stage One and Stage Two heating, and air conditioning. These stages or modes, as illustrated in FIG. 1, are described more extensively as follows. It being assumed that the ambient temperature is between 20° F. and 70° F. when the heat pump can operate at its highest efficiency.

Mode I: The home HVAC system calls for heated air with a typical periodic demand for hot water. The air flow path is shown by: (a) arrow 50A across heat pump condenser coil 14 where there is heat transfer into the air, (b) arrow 50B through blower 16, (c) arrow 50C through hydronic coil heat exchanger, where there is heat transfer from the air into the water flowing through the hydronic coil 20 arrow 50D into house air duct system, and (d) then return air flow as indicated by arrow 50A through condenser coil 14.

The water flow path is shown by: (a) arrow 60 for cold water into the furnace from cold water supply 23, (b) some of this inlet water flows upward (as shown by arrow 60A to hydronic coil 20 in hydronic coil heat exchanger 18, (c) the remaining inlet water flows, per arrow 60B, from the water supply 23 around to flash heater inlet 26, and thence through flash heater 24 where it is heated, and then per arrow 60B the heated water flows through exit 28 to valve 34 which allows hot water to flow either via arrow 60C from hydronic coil 20 or via arrow 60B from flash heater 24. This hot water from either source (hydronic coil or flash heater), if too hot, is mixed by valve 36 with cold water indicated by arrow 60D, resulting in domestic hot water flow per arrow 60E.

Mode II: This is similar to Mode I, except that heat from the heat pump is inadequate for the demand for hot water. This condition is determined by appropriate thermostats and controls which cause valve 34 to block flow of water from the hydronic coil, and to initiate operation of the flash heater and flow of hot water per arrow 60B through valve 34. This is followed by the above-described mixing with cold water as needed to produce the desired temperature of domestic hot water.

Mode III: This is similar to Mode II, however the heat from the heat pump is insufficient for the heat needed for the forced airflow. Now the hydronic coil heat exchanger is employed to add heat to the airflow, as opposed to transferring heat from the airflow, as in Mode I. Here, the flash heater is activated, heated water flows from outlet 70 of the flash heater via arrows 71 to 18A of hydronic coil heat exchanger 18. This water flow heats coil 20 which in turn heats the airflow indicated by arrows 50C through heat exchanger 18. As noted above, appropriate thermostatic and pressure controls will be used to adjust valves and operate the heat pump and flash heater as required.

Mode IV: This is the air conditioning mode, where: (a) the forced air system demands cooled air, (b) the heat pump will be operated in air conditioning mode, and (c) the return air will be cooled by condenser coil 14, flow through blower 16 and through hydronic coil heat exchanger (with no hot or cold water flowing in the hydronic coil). In this mode, the flash heater must provide all the heat for domestic hot water.

Heating Cost Calculations: Sample calculations for determining the cost of operating the Electric Forced Hot Air Hydronic Furnace to provide the domestic water supply are as follows:

Heat Pump operating at a electrical load of 16.7 RLA×220 Volts=3.674 KW

Heat transferred to condenser coil above 20° F. outdoor temperature=36,000 BTU's Formula: 3.674 KW=36,000 BTU's of heat 36,000 BTU's×80% heat transfer to water (excess heat used to warm house)

28,000 BTU's transferred to water heat 28,000 BTU's will raise the temperature of water approximately 48° F. at a flow rate of 1.5 GPM Entering water temp. of 60° F. will rise to 108° F. across the hydronic coil at 1.5 GPM for use as domestic water on-demand.

In comparing two northern homes of the same square footage and insulation factors, we have established the operating cost comparison of the new invention vs. a normal oil fired storage tank for domestic water. The following formula depicts the invention vs. a forced hot air oil system operating at 70% efficiency burning 4 gallons of oil per day with an estimated cost of oil at $2.65 or $10.60 a day.

1 gallon of oil=140,000 BTU's

30% less in oil heating: 30% (140,000 BTU)=42,000 BTU 140,000 BTU's (−) 42,000 BTU's=98,000 BTU's net heat 98,000 BTU's of net heat×4 gal./day=392,000 BTU's per day required to heat the home.

Compared to New Invention

Heat pump will produce 36,000 BTU's per hour 36,000 BTU's×24 hr./day=864,000 BTU's/24-hour day Second Stage subsidized heat from flash heater will not be required if the total load does not exceed 864,000 BTU's per 24 hour period.

Cost to Operate Heat Pump 3.674 KW×0.05/KWH=$0.18/KWH $0.18/KWH×11 hours to satisfy load b=$1.98

$1.98 total cost to archive 392,000 BTU's for the 24-hour period 11 hours×36,000 BTU's=396,000 BTU's The Final Equations $1.98/day new invention cost to heat home vs. $10.60/day per oil $1.98/day×30 (a month)=$59.40/month for new invention $10.60/day×30 days/mo.=$318.00 a month for oil The Comparison Cost Chart shown below demonstrates the remarkably low cost to operate the new furnace and produce domestic On-Demand hot water as compared to the cost to operate conventional oil, natural gas, propane or electrical heaters.

Domestic Hot Water Energy Cost Stored Hot Water Heater vs. On-Demand Electric Forced Hot Air Hydronic Furnace

| Fuel Type/ $ Fuel Price | Energy Produced/ BTU's | Eff % Level Combustion Loss | Storage Loss Est. 60% | Net Used Energy BTU's | Net $ Cost of Used Energy (Based on a 50,000 BTU Day) |
|---|---|---|---|---|---|
| Oil $2.78 per Gallon | 140,000 BTU's | 80% 28,000 BTU's | 67,200 BTU's | 44,8000 BTU's | $3.08 |
| Natural Gas $1.24 per Therm. | 100,000 BTU's | 90% 10,000 BTU's | 54,000 BTU's | 36,000 BTU's | $1.71 |
| Propane $3.68 per Gallon | 100,000 BTU's | 90% 10,000 BTU's | 54,000 BTU's | 36,000 BTU's | $5.09 |
| Electric water tank $.05 per KWH | 3,413 BTU's | 100% 0 | 2,047 BTU's | 1,366 BTU's | $1.83 |
| Electric Forced Hot Air Hydronic Furnace $0.5 per KWH (Heat Pump operating on 3.6 KW = 36,000 BTU's) | 10,000 BTU's | 100%-300% 0 | 0 | 10,000 BTU's | $0.25 |

In a preferred embodiment of the new furnace includes standard components well known in the HVAC industry and sized by a person skilled in this field to be operable and compatible in the new arrangement, with the heat pump condenser coil situated in the path of return re-circulated air, and with an appropriate blower, hydronic coil heat exchanger and electrical flash heater.

The invention herein comprises both the furnace and the method of producing On-Demand hot water and/or heated air for HVAC.

IV. Description of Second Embodiment

In the second embodiment as seen in FIGS. 11-16 utilizes solar panels clad onto a heat pump to provide electrical power which is accumulated in net metering, while the heat pump provides heat or cooling as described in the first embodiment.

With the rebates and tax incentives provided by federal, state and city agencies, for use of solar panels and energy conserving and pollution free heat pumps, the net cost to users of the present invention is startling low, and is so low that the net cost after installation and use would be a free unit, $1,454 credit for installation, and approximately 10 million BTUH of free heating, air conditioning and hot water annually. The data and calculations supporting the above conclusions are shown in documents included in Appendix attached hereto. This appendix includes parts A and B each providing a set of relevant data and calculations to demonstrate the very significant commercial advantage of using the present invention.

While the invention has been described in detail with particular reference to the preferred embodiment thereof, it will be understood that variations and modifications can be effected within the spirit and scope of the invention as previously described and as defined by the claims.

FIGS. 11 and 12 show a heat pump 80 with its top 81 and sides 82, 83, 84 and 85. Sides 82 and 83 are inclined slightly upward and face the sun during the course of the day.

Condenser coil 85 is seen on side 84; the evaporation coil is not seen but would be located in the first heat exchanger of the new furnace as seen schematically in FIG. 1 herein.

FIG. 13 shows an exploded view of the heat pump of FIGS. 11 and 12.

FIGS. 14 and 15 show wiring diagrams for the new furnace, these diagrams corresponding to FIGS. 2 and 4 respectively, for the first embodiment described above.

FIG. 16 is a schematic drawing of a solar wall as used herein.

Attached hereto is an Appendix which includes data and calculations showing the approximate cost of the new solar-heat pump furnace as results from the high efficiencies of heat pump operation and the federal, state and local governmental incentives (including rebates) to use energy conserving and environmentally safe, electrical power sources and hot air and hot water producing apparatus.

As shown in this Appendix on pages 1, 2, the final cost for the new solar panel apparatus is $zero, and the customer will receive a $1,454. rebate and approximately 10 million BTUH of free HVAC and hot water, annually. As shown on pages 28-34, by using the present invention one can provide free cooling in addition to free cost of installation of the new apparatus. This latter calculation is based in part on the KWH credited to the customer over a given period, compared to the KWH required to operate the heat pump and furnace for specified time period which is much less than the solar exposure period.

While the invention has been described with reference to particular embodiments, it is to be understood by those skilled in the art that modifications and variations can be effected within the spirit and scope of the invention. It is further to be understood that although the preferred embodiments are described for a residential system, principles herein are likewise applicable to commercial and otherwise larger or smaller HVAC and hot water systems.

The invention claimed is:

1. An electric forced-air hydronic furnace for heating water for an on-demand hot water system and heating a recirculating air flow in a continuous air duct system, a cold water supply and a hot water outlet, said furnace comprising:

a. a housing, b. an electric flash heater for heating water from said cold water supply to provide said on-demand hot water, c. a split heat pump having an evaporator component thereof located external of said housing and a condenser component thereof that emits heat located within said housing, d. a first heat exchanger within said housing that includes said condenser component as the heat source to heat said recirculating air flow when said heat pump is activated and said condenser component emits heat, e. a second heat exchanger within said housing that receives heated air from said first heat exchanger and includes a hydronic heat exchanger coil through which flows selectively either (i) water from said cold water supply to be heated by heat from said heated air and used for said on-demand hot water, or (ii) hot water from said flash heater to provide supplemental heat to said air flow across said second heat exchanger, f. a blower for forcing said recirculating air flow through said first and second heat exchangers, through said continuous air duct system and back to said first heat exchanger, and g. a control means for operating said furnace for heating and delivering said on-demand hot water and/or for heating said recirculating air.

2. A furnace according to claim 1, wherein said electric flash heater comprises at least first and second heat units operable independently of each other, said first heat unit adapted to provide said on-demand hot water, and said second heat unit adapted to provide hot water to said hydronic heat exchanger coil in said second heat exchanger in said furnace for providing supplemental heat to said recirculating air flow.

3. A furnace according to claim 1, wherein said flash heater comprises at least first and second heat units operable independently of each other, where the number of heat units activated corresponds to the quantity of on-demand hot water needed.

4. A furnace according to claim 3, wherein said electric flash heater has four separate units, each with capacity of about 2.5 gallons per minute.

5. A furnace according to claim 1, further comprising a cold water supply conduit system, comprising: a main inlet, a splitter including a first branch directing said water to said second heat exchanger coil and a second branch directing said water to said electric flash heater, and valve means to selectively control cold water flows into said branches.

6. A furnace according to claim 1, comprising pump and valve means to selectively direct heated water from said second heat exchanger either to said domestic hot water outlet or to said flash heater.

7. A furnace as defined in claim 1, operable with an electric power grid, further comprising a set of photovoltaic solar panels electrically coupled to said power grid and situated for exposure to sunlight, said solar panels adapted to function as an electric current source for reverse current flow into said power grid for net metering when said furnace has no demand for heat pump operation, said heat pump drawing current normally from said power grid when said furnace signals a demand for heat pump operation either to produce heat or refrigeration.

8. A furnace according to claim 7, wherein said solar panels are attached to said top and to at least two sidewall surfaces respectively of said heat pump.

9. A furnace according to claim 7, wherein said solar panels have a capacity for generating electrical current which when directed into a power grid achieves stored credits which are sufficient to substantially pay for electric current demanded by said heat pump during its normal operation.

10. A furnace according to claim 1, wherein said split heat pump comprises evaporator and condenser components external of said housing.

11. A furnace according to claim 1, wherein said split heat pump is selectively operated in reverse as an air conditioner, where said condenser component within said first heat exchanger within said housing operates as an evaporator absorbing heat from said air flow and thus cooling said recirculating air flow.

12. A method, using an electric forced-air hydronic furnace, for heating water for an on-demand hot water system and heating a recirculating air flow in a continuous air duct system, said furnace having a housing and operable with a cold water supply and a hot water outlet, said method comprising the steps:

a. heating water from said cold water supply with an electric flash heater to provide said on-demand hot water, b. providing a split heat pump having an evaporator component thereof located external of said housing and the condenser component thereof that emits heat located within said housing, c. providing a first heat exchanger within said housing that includes said condenser component as the heat source to heat said recirculating air flow when said heat pump is activated and said condenser component emits heat, d. providing a second heat exchanger within said housing that receives heated air from said first heat exchanger and includes a hydronic heat exchanger coil through which flows selectively either (i) water from said cold water supply to be heated by heat from said heated air and used for said on-demand hot water, or (ii) hot water from said flash heater to provide supplemental heat to said air flow across said second heat exchanger, e. with a blower, forcing said recirculating air flow through said first and second heat exchangers, through said continuous air duct system and back to said first heat exchanger, and f. with control means, operating said furnace for heating and delivering said on-demand hot water and/or for heating said recirculating air.

13. A method according to claim 12, operable with an electric power grid, comprising the further steps:

a. electrically coupling a set of photovoltaic solar panels situated for exposure to sunlight to said power grid, said panels adapted to function as an electric power source for reverse current flow into said power grid for net metering when said furnace has no demand for heat pump operation, and b. drawing current from said power grid to operate said heat pump when said furnace signals a demand for heat pump operation either to produce heat or refrigeration.

14. A method according to claim 13, comprising the further steps of attaching said solar panels to said top and sidewall surfaces respectively of said heat pump for overhead and lateral seen exposure.

15. A method according to claim 12, comprising the further steps of situating said evaporator component of said split heat pump in a location where it is exposed to outdoors ambient air.

16. A method according to claim 13, operable with an electric power grid, comprising the further steps:

a. electrically coupling a set of photovoltaic solar panels situated for exposure to sunlight to said power grid, said panels adapted to function as an electric power source for reverse current flow into said power grid for net metering when said furnace has no demand for heat pump operation, and b. drawing current from said power grid to operate said heat pump when said furnace signals a demand for heat pump operation either to produce heat or refrigeration.

17. A method according to claim 12, wherein said split heat pump is selectively operated in reverse as an air conditioner, wherein said condenser component within said first heat exchanger within said housing operates as an evaporator, whereby said first heat exchanger absorbs heat from said air flow across said first heat exchanger which thus cools said recirculating air flow.

* * * * *